United States Patent Office 3,162,619
Patented Dec. 22, 1964

3,162,619
NEW POLYAMIDES FROM MALIDE AND DIAMINES
John L. Lang, Murrysville, Pa., and Thomas E. Durocher, Bay City, Mich., assignors to The Dow Chemical Company, Midland, Mich., a corporation of Delaware
No Drawing. Filed June 14, 1961, Ser. No. 116,964
7 Claims. (Cl. 260—78)

This invention relates to new compositions of matter, and more particularly to synthetic linear condensation polymers. The polymers of the present invention are solid synthetic fiber-forming polyamides.

This invention has as an object the preparation of new and valuable compositions of matter. Another object of this invention is the provision of novel polyamides. These and other objects, as will appear in the following description, are attained in accordance with the practice of the present invention.

In accordance with the present invention, new synthetic polyamides are obtained by reacting malide with a diamine. Malide is an organic heterocyclic compound having the structural formula

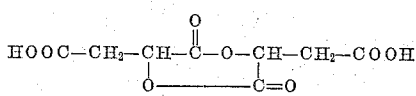

and can be produced in the manner described by Walden in Berichte 32, 2709 (1899), and by Franzen et al. in Berichte, 55B–3, 2995–3001 (1922).

Amines which can be reacted with malide to produce the polyamides of the present invention are primary or secondary diamines. Representative specific examples of diamines suitable for the manufacture of the polyamides of this invention are ethylene diamine, trimethylene diamine, propylene diamine, tetramethylene diamine, pentamethylene diamine, hexamethylene diamine, octamethylene diamine, decamethylene diamine, phenylene diamine, piperazine, urea, para-xylylene diamine, and 3-methylhexamethylene diamine. For the purposes of this invention, urea is regarded as being carbonyl diamine. Mixtures of diamines can be reacted with malide to form mixed polyamides in accordance with this invention.

The reaction of malide with a diamine to produce the fiber-forming polymers of this invention can be carried out directly by heating the mixed reactants in a vessel for an extended period of time. The heating can be performed in a closed vessel under vacuum, slight pressure or in an open vessel at atmospheric pressure. Alternatively, the production of these new polyamides can be conducted in two stages by first forming the amine salt of malide with a diamine and then isolating the salt. After purification, the salt can be heated for an extended period of time in the manner of the direct procedure to obtain high molecular weight polymers of high purity.

The high molecular weight polymers of this invention, formed from malide and an amine are linear condensation polymers which have an intrinsic viscosity of at least 0.4 and which can be drawn into fibers and filaments from melts or solutions of the polymers. The fibers and filaments can be twisted or plied into yarns and strands and fabricated into textiles.

The following examples are illustrative of the present invention but the invention is not limited to the specific details thereof. Throughout this specification, including the following examples, parts and percentages are parts and percentages by weight unless otherwise specified.

Example I

A quantity of piperazine is sublimed in order that it be as dry as possible. An 8.6-gram portion of this sublimed piperazine is mixed with 23.2 grams of malide. The mixture is placed in a heavy wall glass ampule and heated in vacuo to a temperature of 150° C. The temperature is maintained at 150° C. for 8 hours. A light yellow fiber-forming linear condensation polymer of malide and piperazine is obtained.

Example II

One mole of piperazine is dissolved in benzene in a vessel and one mole of malide is added to the solution. The salt of piperazine and malide precipitates from the solution and is recovered by filtration, washing with benzene and drying. The salt thus obtained is then heated in a container to a temperature of 150° C. under vacuum for 6 hours. A resinous material is obtained which is soluble in water and slightly soluble in acetone. Fibrous strands can be drawn from a melt or solution of this polymer.

Example III

An amine salt is obtained by reacting 1 mole of hexamethylene diamine with 1 mole of malide. The salt is purified and heated under vacuum for 6 hours at a temperature of 150° C. The resulting polymer, which is slightly soluble in acetone and completely soluble in water, can be drawn into fibers.

Example IV

The purified salt obtained by reacting a mixture of 1 mole of malide and 1 mole of urea is heated in a vessel to 150° C. for 6 hours during which time the vessel is maintained in vacuo. The product, a high molecular weight condensation polymer of malide and urea, is slightly soluble in acetone and completely soluble in water. This polymer can be made into filaments and fibers by extrusion.

The polymers herein described can be used for protective or decorative coatings, as thickeners, as molding materials in injection and compression molding processes and can be made into useful shaped articles by conventional casting and calendering techniques.

That which is claimed is:
1. A synthetic linear condensation polymer comprising the polyamide reaction product of malide with a diamine.
2. A synthetic linear condensation polymer comprising the polyamide reaction product of malide with piperazine.
3. A synthetic linear condensation polymer comprising the polyamide reaction product of malide with hexamethylene diamine.
4. A synthetic linear condensation polymer comprising the polyamide reaction product of malide with urea.
5. A water soluble synthetic linear condensation polymer, said polymer being the polyamide formed by the reaction of substantially equimolecular proportions of malide and piperazine.
6. A method for the production of synthetic linear polyamides which comprises heating in a vacuum the salt of malide and a diamine.
7. A method for the production of synthetic linear polyamides according to claim 6 in which said salt is the salt of malide and piperazine.

References Cited in the file of this patent

Krieger: Uber Polyamide aus heteroxyklischen Dicarbonsauren (1961).